(12) United States Patent
Chang et al.

(10) Patent No.: US 11,965,069 B2
(45) Date of Patent: Apr. 23, 2024

(54) HEAT-SHRINKABLE POLYESTER FILM AND METHOD FOR MANUFACTURING THE SAME

(71) Applicant: FAR EASTERN NEW CENTURY CORPORATION, Taipei (TW)

(72) Inventors: Li-Ling Chang, Taipei (TW); Yow-An Leu, Taipei (TW); Ting-Yu Lin, Taipei (TW); Ching-Chun Tsai, Taipei (TW); Wen-Yi Chang, Taipei (TW)

(73) Assignee: FAR EASTERN NEW CENTURY CORPORATION, Taipei (TW)

( * ) Notice: Subject to any disclaimer, the term of this patent is extended or adjusted under 35 U.S.C. 154(b) by 150 days.

(21) Appl. No.: 17/169,089

(22) Filed: Feb. 5, 2021

(65) Prior Publication Data

US 2021/0253810 A1   Aug. 19, 2021

(30) Foreign Application Priority Data

Feb. 15, 2020   (TW) .................. 109104900

(51) Int. Cl.
  *C08J 5/18*   (2006.01)
  *C08J 11/12*   (2006.01)

(52) U.S. Cl.
  CPC .............. *C08J 5/18* (2013.01); *C08J 11/12* (2013.01); *C08J 2367/02* (2013.01)

(58) Field of Classification Search
  CPC .... C08J 11/12; C08J 2300/30; C08J 2367/02; C08J 2400/30; C08J 5/18
  See application file for complete search history.

(56) References Cited

U.S. PATENT DOCUMENTS

| | | | |
|---|---|---|---|
| 7,344,765 | B2 | 3/2008 | Hayakawa et al. |
| 2005/0048301 | A1 | 3/2005 | Kim et al. |
| 2008/0057237 | A1* | 3/2008 | Liu ............. B29C 61/003 428/34.9 |
| 2009/0042024 | A1 | 2/2009 | Fujii et al. |
| 2011/0224369 | A1* | 9/2011 | Kim ............. C09D 5/26 528/308.1 |
| 2021/0024708 | A1 | 1/2021 | Ishimaru et al. |
| 2021/0253810 | A1 | 8/2021 | Chang et al. |

FOREIGN PATENT DOCUMENTS

| | | |
|---|---|---|
| CN | 113265122 | 8/2021 |
| EP | 1984434 | 10/2008 |
| JP | 2004196918 | 7/2004 |

(Continued)

*Primary Examiner* — Frances Tischler
(74) *Attorney, Agent, or Firm* — Finnegan, Henderson, Farabow, Garrett & Dunner, LLP

(57) ABSTRACT

A heat-shrinkable polyester film made of a polyester-forming resin composition includes a recycled material, and has an exothermic crystallization peak and an endothermic melting peak which are determined via differential scanning calorimetry, and which satisfy relationships of $T2-T1 \leq 68°$ C. and $T3-T2 \leq 78°$ C., where T1 represents an onset point of the exothermic crystallization peak, T2 represents an end point of the exothermic crystallization peak and an onset point of the endothermic melting peak, and T3 represents an end point of the endothermic melting peak. A method for manufacturing the heat-shrinkable polyester film is also disclosed.

22 Claims, 3 Drawing Sheets

(56) References Cited

FOREIGN PATENT DOCUMENTS

| | | |
|---|---|---|
| JP | 2006150664 | 6/2006 |
| JP | 2009161625 | 7/2009 |
| JP | 4894176 | 3/2012 |
| JP | 5320737 | 10/2013 |
| TW | 581777 | 4/2004 |
| TW | 1230656 | 4/2005 |
| TW | 200624262 | 7/2006 |
| TW | 200813116 | 3/2008 |
| TW | 201945428 | 12/2019 |
| TW | 202132401 | 9/2021 |
| WO | WO-2019188922 A1 * | 10/2019 ........... C08G 63/183 |

* cited by examiner

HEAT-SHRINKABLE POLYESTER FILM AND METHOD FOR MANUFACTURING THE SAME

CROSS-REFERENCE TO RELATED APPLICATION

This application claims priority of Taiwanese Invention Patent Application No. 109104900, filed on Feb. 15, 2020.

FIELD

This disclosure relates to a heat-shrinkable polyester film, and more particularly to a heat-shrinkable polyester film made of a composition which includes a recycled material. This disclosure also relates to a method for manufacturing the heat-shrinkable polyester film.

BACKGROUND

A heat-shrinkable film for packaging is generally required to satisfy the following characteristics:
(1) a heat-shrinkability in a main shrinkage direction (i.e., a transverse direction transverse to a machine direction), which is measured after treatment in hot water at a temperature higher than a glass transition temperature (Tg) of the heat-shrinkable film (e.g., 95° C. or 99° C.) for 10 seconds, and which is required to be sufficiently high (e.g., greater than 73% or even greater than 75%) for packaging of containers having high curvatures;
(2) a heat-shrinkability in the machine direction, which is measured after the same treatment mentioned above, and which is required to be lower than 3%;
(3) a heat-shrinkability in the transverse direction, which is measured after treatment in hot water at 70° C. for 10 seconds, and which is required to be higher than 15%;
(4) a heat-shrinkability in the transverse direction, which is measured after treatment in hot water at 80° C. for 10 seconds, and which is required to be higher than 60%; and
(5) a tear strength per unit thickness in the machine direction which is required to have a relatively low value so as to facilitate removal of the heat-shrinkable film from a container during a recycling process.

In addition, in order to effectively make use of bottle-recycled materials, heat-shrinkable films made thereof have received increased interest in both academic research and industrial development. However, heat-shrinkable films including high content of the bottle-recycled materials might not satisfy the abovementioned requirements. For example, U.S. Pat. No. 7,344,765B2 discloses a heat-shrinkable polyester film having a multi-layer structure of at least two layers, among which at least one layer is a layer containing a polyethylene terephthalate (PET) bottle-recycled material. When the heat-shrinkable polyester film has three layers, two surface layers (i.e., top and bottom layers) may have a content of the PET bottle-recycled material of 7 mass % or smaller, and at least one layer having a content of the PET bottle-recycled material of 7 mass % or larger may be provided as an inner layer other than the surface layers. In Experiment 1 of the Examples section of U.S. Pat. No. 7,344,765B2, the inner layer is made of a polyester resin obtained by mixing 55 mass % of a polyester B, 10 mass % of a polyester C and 35 mass % of a polyester D (i.e., the PET bottle-recycled material), and each of the surface layers is made of a polyester resin obtained by mixing 35 mass % of a polyester A, 55 mass % of the polyester B and 10 mass % of the polyester C. The inner layer is co-extruded with the surface layers from a monoaxial extruder equipped with a T-die at 280° C., followed by rapid cooling and drawing to obtain a heat-shrinkable polyester film of Experiment 1. Overall, the heat-shrinkable polyester film of Experiment 1 includes 17.5 mass % of the PET bottle-recycled material (i.e., polyester D), and has a heat-shrinkability of 65%, which is measured after immersing the heat-shrinkable film in hot water at 95° C. for 10 seconds and then in water at 25° C. The heat-shrinkability is lower than the 73% required for packaging of containers having high curvatures. Similarly, U.S. Patent Application Publication No. US20090042024A1, Japanese Patent Application Publication No. 2006150664A, and Japanese Patent No. 4894176B2 disclose heat-shrinkable films having three-layered structures, in which an amount of recycled material in the surface layers and the inner layer of the three-layered structures is different from one another. The heat-shrinkable films disclosed in the abovementioned patent documents have heat-shrinkabilities lower than 60%, which are measured after immersing the heat-shrinkable films in hot water at 80° C. for 10 seconds and then in water at 25° C. for 10 seconds. Such heat-shrinkage characteristics are unsatisfactory for packaging of containers having high curvatures.

Further, researchers have also shown great interest in heat-shrinkable films made by mixing the PET bottle-recycled materials and amorphous polyesters. Japanese Patent No. 5320737B2 discloses a heat-shrinkable polyester film made by extruding a composition including a PET bottle-recycled material and an amorphous polyester at a temperature ranging from 275° C. to 290° C. The heat-shrinkable polyester film is a single-layered film including 40 wt % of the PET bottle-recycled material and has a heat-shrinkability in the transverse direction which ranges from 50% to 75% (at most 69% in experimental examples), and a heat-shrinkability in the machine direction which ranges from 5% to 8%, which might result in a label made from the heat-shrinkable film being unable to shrink tightly over a curved edge at a top of a container. The heat-shrinkabilities in the transverse direction and the machine direction are measured after immersing the heat-shrinkable polyester film in hot water at 98° C. for 10 seconds and then in water at 25° C. for 10 seconds. Similarly, Japanese Patent Application Publication No. 2004196918A discloses a heat-shrinkable film in Example 1 which is made by extruding a mixture of a PET bottle-recycled material and an amorphous polyester resin. The heat-shrinkable film has a heat-shrinkability of 41% in the transverse direction, which is measured after immersing the heat-shrinkable film in hot water at 80° C. for 10 seconds.

Therefore, there is still a need to provide heat-shrinkable films which include high content of bottle-recycled materials, and which have satisfactory characteristics for packaging of containers having high curvatures.

SUMMARY

Therefore, a first object of the disclosure is to provide a heat-shrinkable polyester film that can alleviate or eliminate at least one of the drawbacks of prior art. A second object of the disclosure is to provide a method for manufacturing the heat-shrinkable polyester film.

According to a first aspect of the disclosure, a heat-shrinkable polyester film is made of a polyester-forming resin composition which includes a recycled material. The heat-shrinkable polyester film has an exothermic crystallization peak and an endothermic melting peak which are determined via differential scanning calorimetry, and which satisfy relationships of T2−T1≤68° C. and T3−T2≤78° C., where T1 represents an onset point of the exothermic crystallization peak, T2 represents an end point of the exothermic crystallization peak and an onset point of the endothermic melting peak, and T3 represents an end point of the endothermic melting peak.

According to a second aspect of the disclosure, a heat-shrinkable polyester film is made of a polyester-forming resin composition which includes a recycled material. The heat-shrinkable polyester film satisfies relationships of $\Delta n_c \leq 10 \times 10^{-3}$, and $\Delta n_c = \Delta n \times [1-(99° C. TD \%/TDMax \%)]$, where $\Delta n$ represents a birefringence of the heat-shrinkable polyester film, 99° C. TD % represents a heat-shrinkability of the heat-shrinkable polyester film in a transverse direction, which is measured according to JIS 21709 after immersing the heat-shrinkable polyester film in hot water at 99° C. for 10 seconds and then removing from the hot water, and TDMax %=[(TDX−1)/TDX]×100%, in which TDX represents a stretch ratio of a sheet that is made from the polyester-forming resin composition in the transverse direction in a process for forming the heat-shrinkable polyester film.

According to a third aspect of the disclosure, a heat-shrinkable polyester film is made of a polyester-forming resin composition which includes a recycled material, and has a tear strength per unit thickness in a machine direction, which ranges from 5 N/mm to 28 N/mm, and which is determined according to JIS K7128, and a heat-shrinkability which is measured according to JIS 21709 after immersing the heat-shrinkable polyester film in hot water for 10 seconds and then removing from the hot water. The heat-shrinkability in a transverse direction is at least 73.0% when the hot water is 99° C. The heat-shrinkability in a machine direction ranges from −3.0% to 3.0% when the hot water is 99° C. The heat-shrinkability in the transverse direction is at least 60.0% when the hot water is 80° C. The heat-shrinkability in the transverse direction is at least 15.0% when the hot water is 70° C.

According to a fourth aspect of the disclosure, a method for manufacturing the heat-shrinkable polyester film includes the steps of:
  a) providing the polyester-forming resin composition including the recycled material;
  b) heating the polyester-forming resin composition in nitrogen atmosphere to permit the polyester-forming resin composition to undergo esterification reaction so as to obtain an esterified product;
  c) subjecting the esterified product to heating and polymerization reaction in vacuum and in the presence of a catalyst and a heat stabilizer until the esterified product reaches an intrinsic viscosity ranging from 0.5 dL/g to 0.8 dL/g so as to obtain a polyester product;
  d) subjecting the polyester product to granulation to obtain a plurality of polyester chips;
  e) subjecting the polyester chips to heating and extruding so as to obtain a sheet; and
  f) subjecting the sheet to a film formation process so as to obtain the heat-shrinkable polyester film.

The heat-shrinkable polyester film of the disclosure satisfy relationships of T2−T1≤68° C. and T3−T2≤78° C. or has a relatively low $\Delta n_c$, and thus may exhibit satisfactory characteristics such as a high heat-shrinkability in the transverse direction and a low heat-shrinkability in the machine direction at various temperatures, a relatively low tear strength per unit thickness in the machine direction, and a relatively high elongation at break in the machine direction after accelerated aging, etc. By having the abovementioned characteristics, the heat-shrinkable polyester film may satisfy the requirements for packaging of containers having high curvatures (e.g., complete shrinkage, a good appearance without creases, and easy removal from containers during a recycling process). In addition, in a conventional method, the recycled material and amorphous polyester are usually independently formed into two types of plastic chips and then blended for manufacturing a heat-shrinkable polyester film. As such, a transesterification reaction between the recycled material and the amorphous polyester may be insufficient, resulting in the thus obtained heat-shrinkable polyester film having unsatisfactory characteristics for packaging of containers having high curvatures. In comparison with the conventional method, the method for manufacturing the heat-shrinkable polyester film of the disclosure includes blending and reacting the components in the polyester-forming resin composition (including the recycled material), and then granulating to obtain the polyester chips. The thus obtained heat-shrinkable polyester film may satisfy the requirements for packaging of containers having high curvatures.

BRIEF DESCRIPTION OF THE DRAWINGS

Other features and advantages of the disclosure will become apparent in the following detailed description of the embodiment with reference to the accompanying drawing, of which.

DETAILED DESCRIPTION

<First Embodiment of Heat-Shrinkable Polyester Film>

Figure 1:
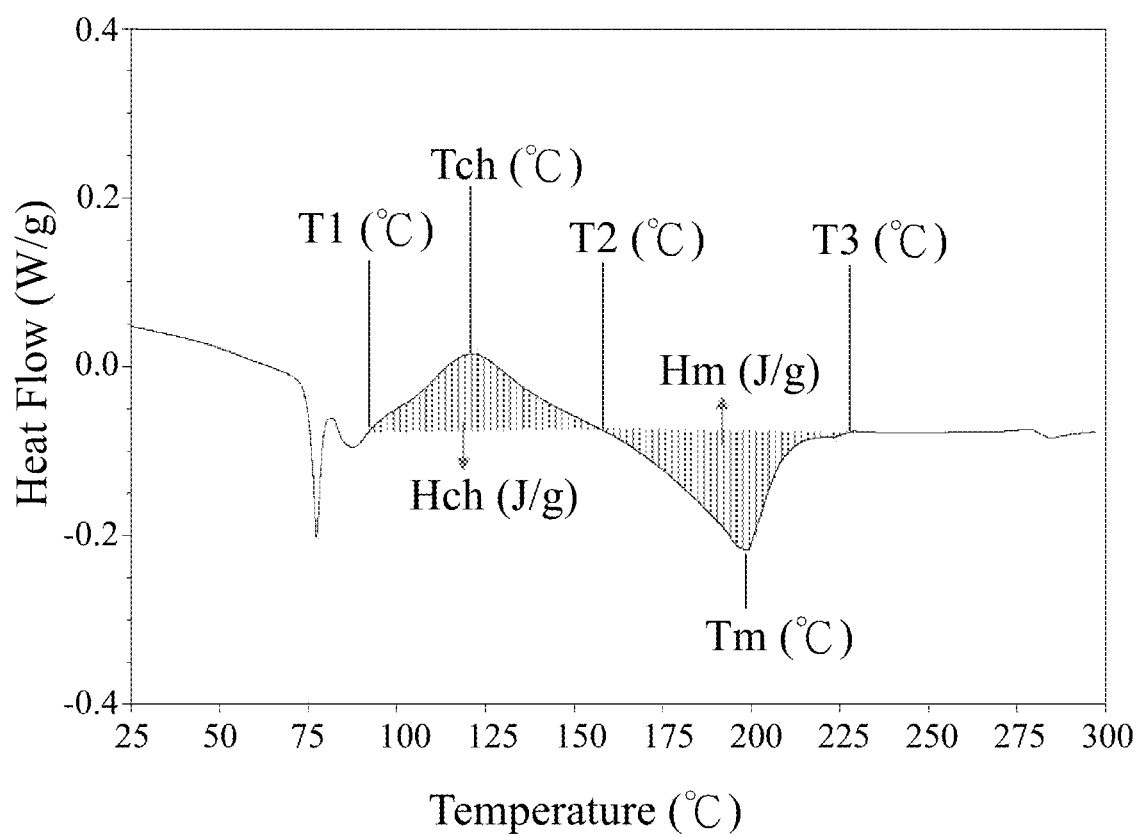
FIG. 1 depicts a differential scanning calorimetry (DSC) curve illustrating an exothermic crystallization peak and an endothermic melting peak for a heat-shrinkable polyester film.

A first embodiment of a heat-shrinkable polyester film according to the disclosure is made of a polyester-forming resin composition which includes a recycled material, and has, as shown in FIG. 1, an exothermic crystallization peak and an endothermic melting peak which are determined via differential scanning calorimetry (DSC), and which satisfy relationships of T2−T1≤68° C. and T3−T2≤78° C. T1 represents an onset point of the exothermic crystallization peak, T2 represents an end point of the exothermic crystallization peak and an onset point of the endothermic melting peak, and T3 represents an end point of the endothermic melting peak. In certain embodiments, T2−T1 ranges from 30° C. to 68° C., and T3−T2≤ranges from 30° C. to 78° C. In this embodiment, T2−T1 ranges from 50° C. to 65° C., and T3-T2 ranges from 50° C. to 75° C.

As used herein, the term "recycled material" refers broadly to any recycled or recovered material for forming polyesters (e.g., recycled terephthalic acid (rTPA)) or a material obtained from a recycling process of a polyester product (e.g., polyethylene terephthalate (PET) bottle-recycled material). In certain embodiments, the recycled material is rTPA, PET bottle-recycled material, or a combination thereof. In this embodiment, the recycled material is the PET bottle-recycled material, and has an intrinsic viscosity ranging from 0.5 dL/g to 1.00 dL/g. An amount of the recycled material in the heat-shrinkable polyester film can be adjusted based on practical requirements. For example, in certain embodiments, the recycled material is present in an amount greater than 10 wt % based on a total weight of the polyester-forming resin composition. In certain embodiments, the recycled material is present in an amount ranging from 10 wt % to 96 wt % based on the total weight of the polyester-forming resin composition. In this embodiment, the recycled material is present in an amount ranging from 15 wt % to 87 wt % based on the total weight of the polyester-forming resin composition.

In certain embodiments, the exothermic crystallization peak and the endothermic melting peak may further satisfy relationships of Tm≤220° C., Tch≥110° C., and |Hm−Hch|≤9.0 J/g, where Tm represents a maximum point of the endothermic melting peak, Tch represents a maximum point of the exothermic crystallization peak, Hm represents a melting enthalpy calculated from the endothermic melting peak, and Hch represents a crystallization enthalpy calculated from the exothermic crystallization peak. In certain embodiments, Tm ranges from 160° C. to 210° C., Tch ranges from 110° C. to 130° C., and |Hm−Hch| ranges from 2 J/g to 9 J/g. In this embodiment, Tm ranges from 185° C. to 200° C., Tch ranges from 120° C. to 130° C., and |Hm−Hch| ranges from 2.5 J/g to 7 J/g.

In certain embodiments, the heat-shrinkable polyester film of the disclosure satisfies relationships of $\Delta n_c \leq 10 \times 10^{-3}$, and $\Delta n_c = \Delta n \times [1-(99° \text{ C. TD \%/TDMax \%})]$, where $\Delta n$ represents a birefringence of the heat-shrinkable polyester film, 99° C. TD % represents a heat-shrinkability of the heat-shrinkable polyester film in a transverse direction (i.e., transverse to a machine direction), which is measured according to JIS 21709 after immersing the heat-shrinkable polyester film in hot water at 99° C. for 10 seconds and then removing from the hot water, and TDMax %=[(TDX−1)/TDX]×100%, in which TDX represents a stretch ratio of a sheet in the transverse direction in a process for forming the heat-shrinkable polyester film. The sheet is made of the polyester-forming resin composition. In certain embodiments, $\Delta n_c \leq 4 \times 10^{-3}$. In this embodiment, $\Delta n_c$ ranges from $2.9 \times 10^{-3}$ to $4 \times 10^{-3}$.

In certain embodiments, the heat-shrinkable polyester film of the disclosure has a heat-shrinkability which is measured according to JIS Z1709 after immersing the heat-shrinkable polyester film in hot water for 10 seconds and then removing from the hot water. The heat-shrinkability in the transverse direction when the hot water is 99° C. (99° C. TD) is at least 73.0%. The heat-shrinkability in the machine direction when the hot water is 99° C. (99° C. MD) ranges from −3.0% to 3.0%. The heat-shrinkability in the transverse direction when the hot water is 80° C. (80° C. TD) is at least 60.0%, and the heat-shrinkability in the transverse direction when the hot water is 70° C. (70° C. TD) is at least 15.0%. In certain embodiments, 99° C. TD is at least 75.0%, 99° C. MD ranges from −3.0% to 0.5%, 80° C. TD is at least 65.0%, and 70° C. TD is at least 25.0%.

In certain embodiments, the heat-shrinkable polyester film of the disclosure has a heat-shrinkability measured according to JIS 21709 after immersing the heat-shrinkable polyester film in hot water for 10 seconds and then removing from the hot water, which satisfies relationships of Δ(70−60) TD %=(70° C. TD %−60° C. TD %)/(70° C.−60° C.)≥1.5%/° C., and Δ(90−80) TD %=(90° C. TD %−80° C. TD %)/(90° C.−80° C.)≤1%/° C., where 60° C. TD %, 70° C. TD %, 80° C. TD %, and 90° C. TD % represent values of the heat-shrinkability in the transverse direction when the hot water is 60° C., 70° C., 80° C., and 90° C., respectively. In certain embodiments, Δ(70−60) TD % ranges from 2%/° C. to 4%/° C., and Δ(90−80) TD % is not greater than 0.85%/° C.

In certain embodiments, the heat-shrinkability of the disclosure has an intrinsic viscosity ranging from 0.600 dL/g to 0.740 dL/g, a tear strength per unit thickness in the machine direction which ranges from 5 N/mm to 28 N/mm, and which is determined according to JIS K7128, and an elongation at break in the machine direction, which is greater than 400%, and which is determined according to ASTM D882 after accelerated aging of the heat-shrinkable polyester film at 60° C. for an hour. In certain embodiments, the intrinsic viscosity of the heat-shrinkable polyester film ranges from 0.610 dL/g to 0.670 dL/g. In certain embodiments, the tear strength per unit thickness of the heat-shrinkable polyester film in the machine direction ranges from 10 N/mm to 28 N/mm. In certain embodiments, the elongation at break of the heat-shrinkable polyester film in the machine direction after accelerated aging at 60° C. for an hour ranges from 400% to 800%.

<Polyester-Forming Resin Composition>

Apart from the recycled material, the polyester-forming resin composition further includes other materials for forming the polyesters, such as ethylene glycol, terephthalic acid, and a modifier. The modifier may be any component capable of modifying characteristics of the heat-shrinkable polyester film. For example, the modifier may be a component for providing amorphous characteristics (e.g., an acid, an alcohol or a combination thereof), but is not limited thereto.

In certain embodiments, the modifier may be an alcohol such as 1,3-propanediol, butanediol, neopentyl glycol (NPG), 1,5-pentanediol, 2-methyl-1,3-propanediol (MPDO), 2,2-diethyl-1,3-propanediol, 2-butyl-2-ethyl-1,3-propanediol (BEPD), 1,6-hexanediol, 1,4-cyclohexanedimethanol (CHDM), diethylene glycol (DEG), triethylene glycol (TEG), polyethylene glycol (PEG), polypropylene glycol (PPG), polybutylene glycol, poly(tetramethylene ether) glycol (PTMEG), 1,10-decandiol, 2,3-dimethyl-2,3-butanediol, trimethylolmethane, trimethylolethane, trimethylolpropane, pentaerythritol, propane-1,2,3-triol, 1,2,6-hexanetriol, or combinations thereof, but is not limited thereto. In certain embodiments, the modifier may be an acid selected from isophthalic acid (IPA), 1,4-cyclohexanedicarboxylic acid (1,4-CHDA), oxalic acid, succinic acid, adipic acid (AA), sebacic acid, azalaic acid, 1,4-naphthalenedicarboxylic acid, 2,5-furandicarboxylic acid (FDCA), and combinations thereof, but is not limited thereto. In certain embodiments, the modifier may be one of isophthalic acid, succinic acid, adipic acid, 1,3-propanediol, 2,2-diethyl-1,3-propanediol, 2-butyl-2-ethyl-1,3-propanediol, 1,6-hexanediol, 2,3-dimethyl-2,3-butanediol, neopentyl glycol, 2-methyl-1,3-propanediol, 1,4-cyclohexanedimethanol, butanediol, diethylene glycol, triethylene glycol, polyethylene glycol, poly(tetramethylene ether) glycol, or combinations thereof.

Amounts of the ethylene glycol, the terephthalic acid, and the modifier may be adjusted based on practical requirements. For example, when the modifier is an alcohol, based on a total molar amount of the ethylene glycol and the modifier, the ethylene glycol is present in an amount ranging from 50 mol % to 95 mol %, and the modifier (the alcohol) is present in an amount ranging from 5 mol % to 50 mol %. When the modifier is an acid, based on a total molar amount of the terephthalic acid and the modifier, the terephthalic acid is present in an amount greater than 85 mol % and less than 100 mol %, and the modifier (the acid) is present in an amount greater than 0 mol % and not greater than 15 mol %.

When the modifier is a combination of an acid and an alcohol, the amounts of the acid and the alcohol of the modifier may have the same ranges as defined above.

In certain embodiments, the polyester-forming resin composition may further include other additives based on practical requirements. Examples of the additives may include, but are not limited to, catalysts, heat-stabilizers, stabilizers, antioxidants, antistatic agents, antifoam agents, dyeing assistants, dyes, colorants, delusterants, fluorescent brighteners, reaction promoters, and other additives. Examples of the catalysts may include, but are not limited to, antimony trioxide ($Sb_2O_3$), titanium-containing catalysts, germanium-containing catalysts, tin-containing catalysts, gallium-containing catalysts, aluminum-containing catalysts, and combinations thereof. Examples of the heat-stabilizers may include, but are not limited to, phosphoric acid, trimethyl phosphate, triethyl phosphate, tripropyl phosphate (TPP), etc. The reaction promoters may include tetraethylammonium hydroxide), etc.

In certain embodiments, the polyester-forming resin composition may include the polyethylene terephthalate bottle-recycled material, the terephthalic acid, the ethylene glycol, and the neopentyl glycol (the modifier). Based on a total molar amount of the ethylene glycol and the neopentyl glycol, the ethylene glycol is present in an amount ranging from 70 mol % to 85 mol %, and the neopentyl glycol is present in an amount ranging from 15 mol % to 30 mol %. In certain embodiments, the polyester-forming resin composition may include the rTPA, the ethylene glycol, and the neopentyl glycol. In certain embodiments, the polyester-forming resin composition may include the rTPA, the PET bottle-recycled material, the ethylene glycol, and the neopentyl glycol.

<Second Embodiment of Heat-Shrinkable Polyester Film>

According to the disclosure, a second embodiment of the heat-shrinkable polyester film is made of the polyester-forming resin composition which includes the recycled material, and satisfies the relationships of $\Delta n_c \leq 10 \times 10^{-3}$, and $\Delta n_c = \Delta n \times [1-(99° C. TD \%/TDMax \%)]$. An represents a birefringence of the heat-shrinkable polyester film. 99° C. TD % represents a heat-shrinkability of the heat-shrinkable polyester film in the transverse direction, which is measured according to JIS 21709 after immersing the heat-shrinkable polyester film in hot water at 99° C. for 10 seconds and then removing from the hot water. TDMax %=[(TDX−1)/TDX]× 100%, in which TDX represents a stretch ratio of a sheet in the transverse direction in a process for forming the heat-shrinkable polyester film. The sheet is made of the polyester-forming resin composition.

<Third Embodiment of Heat-Shrinkable Polyester Film>

According to the disclosure, a third embodiment of the heat-shrinkable polyester film is made of the polyester-forming resin composition which includes the recycled material, and has a tear strength per unit thickness in the machine direction which ranges from 5 N/mm to 28 N/mm, and which is determined according to JIS K7128, and a heat-shrinkability which is measured according to JIS 21709 after immersing the heat-shrinkable polyester film in hot water for 10 seconds and then removing from the hot water. The heat-shrinkability in the transverse direction is at least 73.0% when the hot water is 99° C. The heat-shrinkability in the machine direction ranges from −3.0% to 3.0% when the hot water is 99° C. The heat-shrinkability in the transverse direction is at least 60.0% when the hot water is 80° C. The heat-shrinkability in the transverse direction is at least 15.0% when the hot water is 70° C.

In certain embodiments, the heat-shrinkable polyester film has an intrinsic viscosity ranging from 0.600 dL/g to 0.740 dL/g, and an elongation at break in the machine direction, which is greater than 400%, and which is determined according to ASTM D882 after accelerated aging of the heat-shrinkable polyester film at 60° C. for an hour.

<Method for Manufacturing the Heat-Shrinkable Polyester Film>

According to the disclosure, an embodiment of a method for manufacturing the heat-shrinkable polyester film of the disclosure includes the steps of:

a) providing the polyester-forming resin composition including the recycled material;

b) heating the polyester-forming resin composition in nitrogen atmosphere to permit the polyester-forming resin composition to undergo esterification reaction so as to obtain an esterified product;

c) subjecting the esterified product to heating and polymerization reaction in vacuum and in the presence of the catalyst and the heat stabilizer until the esterified product reaches an intrinsic viscosity ranging from 0.5 dL/g to 0.8 dL/g so as to obtain a polyester product;

d) subjecting the polyester product to granulation so as to obtain a plurality of polyester chips;

e) subjecting the polyester chips to heating and extruding so as to obtain a sheet; and f) subjecting the sheet to a film formation process so as to obtain the heat-shrinkable polyester film.

In certain embodiments, in step b), the polyester-forming resin composition is heated at a temperature ranging from 225° C. to 275° C. In this embodiment, the temperature in step b) is 250° C.

In certain embodiments, in step c), the esterified product is heated at a temperature ranging from 250° C. to 300° C. In this embodiment, the temperature in step c) is 275° C.

In certain embodiments, in step e), the polyester chips are heated in multiple stages at temperatures ranging from 200° C. to 260° C.

In certain embodiments, in step f), the sheet in the film formation process is heated and softened at a temperature ranging from 80° C. to 110° C., and then stretched in the transverse direction at a stretch ratio ranging from 3 to 5.5 at a temperature ranging from 70° C. to 100° C. In this embodiment, the sheet is heated and softened at 98° C. and then stretched in the transverse direction at a stretch ratio of 4.8 at 83° C.

Examples of the disclosure will be described hereinafter. It is to be understood that these examples are exemplary and explanatory and should not be construed as a limitation to the disclosure.

<Chemicals>

The following chemicals were used in both the examples and the comparative examples shown below. It should be noted that, intrinsic viscosities of the chemicals were determined according to ASTM D4603 (published in 2003). In details, 0.1 g of a polyester chip was weighted and added into a flask containing mL of a solvent that includes 1,1,2, 2-tetrachloroethane and a phenol (a weight ratio of 1,1,2,2-tetrachloroethane to the phenol was 2:3). Next, the contents in the flask were heated and stirred for 20 minutes to 30 minutes to dissolve the polyester chip so as to form a test liquid. Then, the flask was cooled in a water bath at room temperature, and then moved to another water bath so as to keep the flask at a constant temperature of 30° C. A time taken for each of the solvent and the test liquid to pass through an Ostwald viscometer was recorded, and the intrinsic viscosity (η) of the polyester chip was calculated according to Huggins equation as listed below:

$$\eta = \lim_{C \to 0}\left(\frac{\eta_{sp}}{C}\right); \frac{\eta_{sp}}{C} = |\eta| + k|\eta|^2 C; \eta_{sp} = \frac{t - t_0}{t_0},$$

where $\eta_{sp}$ is a specific viscosity of the polyester chip, C is a concentration of the polyester chip in the test liquid, k is Huggins constant, $t_0$ is the time taken for the solvent to pass through the viscometer, and t is the time taken for the test liquid to pass through the viscometer.

1. P1 Polyester Chip:

PET bottle-recycled flakes were extruded at 280° C. in an extruder, and then subjected to granulation in a granulator so as to obtain the P1 polyester chips. The P1 polyester chips were measured to have an intrinsic viscosity of 0.605 dL/g.

2. P2 Polyester Chip:

PET bottle-recycled flakes were extruded at 280° C. in the extruder, and then subjected to granulation in the granulator. Thereafter, for increasing viscosity, the granulated PET bottle-recycled chips were subjected to a solid-state polymerization reaction so as to obtain the P2 polyester chips. The P2 polyester chips were measured to have an intrinsic viscosity of 0.820 dL/g.

3. P3 Polyester Chip (NPG-Modified PET):

33043.94 g (198.9 mol) of terephthalic acid, 12153.07 g (195.8 mol) of ethylene glycol, 5502.65 g (52.8 mol) of neopentyl glycol (NPG), and 12.00 g of tetraethylammonium hydroxide were mixed in a reactor to obtain a mixture. Based on a total molar amount of the ethylene glycol and the neopentyl glycol in the mixture, the ethylene glycol is present in an amount of 78.8 mol % and the neopentyl glycol is present in an amount of 21.2 mol %. Subsequently, after the mixture in the reactor was heated to 250° C. and evenly mixed, the mixture was subjected to an esterification reaction under an atmosphere of nitrogen gas while the thus produced water was removed via distillation until an amount of the water removed reached a theoretical value of esterification. Next, 300 parts per million (ppm) of antimony trioxide (as a catalyst) and 50 ppm of phosphoric acid (as a heat-stabilizer) were added into the reactor to obtain a reactant, followed by polycondensation of the reactant at a temperature of 275° C. under a vacuum atmosphere. The polycondensation proceeded until an intrinsic viscosity (IV) of the reactant reached a range from 0.5 dL/g to 0.7 dL/g, followed by granulation in the granulator to obtain 40000.00 g of the P3 polyester chips. The P3 polyester chips were measured to have a glass transition temperature of 78° C. and an intrinsic viscosity of 0.671 dL/g. An actual amount of the neopentyl glycol in the P3 polyester chips calculated using nuclear magnetic resonance (NMR) was 22.5 mol % based on the total molar amount of the ethylene glycol and the neopentyl glycol.

4. P4 Polyester Chip (NPG-Modified PET Including 15 wt % of the Recycled Material):

6000.00 g of the P1 polyester chips, 27856.96 g (167.7 mol) of terephthalic acid, 10215.10 g (164.6 mol) of ethylene glycol, 5502.65 g (52.8 mol) of neopentyl glycol (NPG), and 12.00 g of tetraethylammonium hydroxide were mixed in a reactor to obtain a mixture. Subsequently, after the mixture in the reactor was heated to 250° C. and evenly mixed, the mixture was subjected to an esterification reaction under an atmosphere of nitrogen gas while the thus produced water was removed via distillation until an amount of the water removed reached a theoretical value of esterification. Next, 300 ppm of antimony trioxide (as a catalyst) and 50 ppm of phosphoric acid (as a heat-stabilizer) were added into the reactor to obtain a reactant, followed by polycondensation of the reactant at a temperature of 275° C. under a vacuum atmosphere. The polycondensation proceeded until an intrinsic viscosity (IV) of the reactant reached a range from 0.5 dL/g to 0.7 dL/g, followed by granulation in the granulator to obtain 40000.00 g of the P4 polyester chips. The P4 polyester chips were measured to have a glass transition temperature of 78° C. and an intrinsic viscosity of 0.676 dL/g. An actual amount of the neopentyl glycol in the P4 polyester chips calculated using NMR was 22.8 mol % based on the total molar amount of the ethylene glycol and the neopentyl glycol.

5. P5 Polyester Chip (NPG-Modified PET Including 30 wt % of the Recycled Material):

The procedures and conditions for producing the P5 polyester chips were similar to those of the P4 polyester chips except that the amounts of the P1 polyester chips, the terephthalic acid, and the ethylene glycol added in the reactor for producing the P5 polyester chips were 12000.00 g, 22669.99 g (136.5 mol), and 8277.12 g (133.35 mol), respectively. The P5 polyester chips were measured to have a glass transition temperature of 79° C. and an intrinsic viscosity of 0.680 dL/g. The actual amount of the neopentyl glycol in the P5 polyester chips calculated by NMR was 23.6 mol % based on the total molar amount of the ethylene glycol and the neopentyl glycol.

6. P6 Polyester Chip (NPG-Modified PET Including 50 wt % of the Recycled Material):

The procedures and conditions for producing the P6 polyester chips were similar to those of the P4 polyester chips except that the amounts of the P1 polyester chips, the terephthalic acid, and the ethylene glycol added in the reactor for producing the P6 polyester chips were 20000.00 g, 15754.03 g (94.8 mol), and 5693.16 g (91.72 mol), respectively. The P6 polyester chips were measured to have a glass transition temperature of 78° C. and an intrinsic viscosity of 0.670 dL/g. The actual amount of the neopentyl glycol in the P6 polyester chips calculated by NMR was 23.6 mol % based on the total molar amount of the ethylene glycol and the neopentyl glycol.

7. P7 Polyester Chip (NPG-Modified PET Including 70 wt % of the Recycled Material):

The procedures and conditions for producing the P7 polyester chips were similar to those of the P4 polyester chips except that the amounts of the P1 polyester chips, the terephthalic acid, and the ethylene glycol added in the reactor for producing the P7 polyester chips were 28000.00 g, 8838.07 g (53.2 mol), and 3109.20 g (50.1 mol), respectively. The P7 polyester chips were measured to have a glass transition temperature of 78° C. and an intrinsic viscosity of 0.660 dL/g. The actual amount of the neopentyl glycol in the P7 polyester chips calculated by NMR was 24.2 mol % based on the total molar amount of the ethylene glycol and the neopentyl glycol.

8. P8 Polyester Chip (NPG-Modified PET Including 82.6 wt % of the Recycled Material):

The procedures and conditions for producing the P8 polyester chips were similar to those of the P4 polyester chips except that for producing the P8 polyester chips, the P1 polyester chips were omitted, 33043.93 g (198.9 mol) of rTPA was used instead of the terephthalic acid, and the amount of the ethylene glycol added in the reactor was 12153.07 g (195.8 mol). The P8 polyester chips were measured to have a glass transition temperature of 78° C. and an intrinsic viscosity of 0.678 dL/g. The actual amount of the neopentyl glycol in the P8 polyester chips calculated by NMR was 22.4 mol % based on the total molar amount of the ethylene glycol and the neopentyl glycol.

9. P9 Polyester Chip (NPG-Modified PET Including 86.7 wt % of the Recycled Material):

The procedures and conditions for producing the P9 polyester chips were similar to those of the P4 polyester chips except that for producing the P9 polyester chips, 22669.99 g (136.5 mol) of rTPA was used instead of the terephthalic acid, and the amounts of the P1 polyester chips and the ethylene glycol added in the reactor were 12000.00 g and 8277.12 g (133.35 mol), respectively. The P9 polyester chips were measured to have a glass transition temperature of 77° C. and an intrinsic viscosity of 0.682 dL/g. The actual amount of the neopentyl glycol in the P9 polyester chips calculated by NMR was 23.2 mol % based on the total molar amount of the ethylene glycol and the neopentyl glycol.

Example 1 (EX1) Preparation of a Heat-Shrinkable Polyester Film

The P4 polyester chips were dried until a moisture content thereof was 200 ppm or lower to obtain dried P4 polyester chips. The dried P4 polyester chips were fed into a twin-screw extruder, and then heated and melted in multiple stages at a temperature ranging from 210° C. to 260° C. Thereafter, the molten polyester was extruded from T-die head and further brought into contact with a casting rolls while cooling rapidly to obtain a sheet.

The sheet was then processed through a stretching machine (Manufacturer: Brückner Karoiv) at a rate of M/min at a preheating temperature of 98° C., followed by stretching in the transverse direction at a stretch ratio of 4.8 at 83° C. Finally, the stretched sheet was annealed at an annealing temperature of 76° C. to obtain a heat-shrinkable polyester film of EX1 having a thickness of 40.5 μm. The recycled material is present in an amount of 15 wt % in the heat-shrinkable polyester film of EX1 based on a total weight of the polyester-forming resin composition.

Examples 2 to 6 (EX2 to EX6)

The procedures and conditions for preparing the heat-shrinkable polyester films of EX2 to EX6 were similar to those of EX1, except that EX2 was made from the P5 polyester chips and includes 30 wt % of the recycled material, EX3 was made from the P6 polyester chips and includes 50 wt % of the recycled material, EX4 was made from the P7 polyester chips and includes 70 wt % of the recycled material, EX5 was made from the P8 polyester chips and includes 82.6 wt % of the recycled material, and EX6 was made from the P9 polyester chips and includes 86.7 wt % of the recycled material. Thicknesses of the heat-shrinkable polyester films of EX2 to EX6 are as listed in Table 4 below.

Comparative Example 1 (CE1)

The procedures and conditions for preparing the heat-shrinkable polyester film of CE1 were similar to those of EX1, except that the heat-shrinkable polyester film of CE1 was made from the P3 polyester chip, and the recycled material was omitted.

Comparative Example 2 (CE2)

The procedures and conditions for preparing the heat-shrinkable polyester film of CE2 were similar to those of EX1, except that the P1 and P3 polyester chips were used instead of the P4 polyester chips to make the heat-shrinkable polyester film of CE2. To be specific, the P1 and P3 polyester chips were dried until a moisture content thereof was 200 ppm or lower. The dried P1 and P3 polyester chips were then blended in a weight ratio of 30:70, and then fed into the twin-screw extruder for forming sheet.

Comparative Example 3 (CE3)

The procedures and conditions for preparing the heat-shrinkable polyester film of CE3 were similar to those of CE2, except that, in CE3, the weight ratio between the P1 and P3 polyester chips was 50:50, and the stretching temperature of the sheet of CE3 was 85° C.

Comparative Example 4 (CE4)

The procedures and conditions for preparing the heat-shrinkable polyester film of CE4 were similar to those of CE2, except that, in CE4, the weight ratio between the P1 and P3 polyester chips was 70:30, and the stretching temperature of the sheet of CE4 was 85° C.

Comparative Example 5 (CE5)

The procedures and conditions for preparing the heat-shrinkable polyester film of CE5 were similar to those of EX1, except that the P2 and P3 polyester chips were used instead of the P4 polyester chips to make the heat-shrinkable polyester film of CE5. To be specific, the P2 and P3 polyester chips were dried until a moisture content thereof was 200 ppm or lower. The dried P2 and P3 polyester chips were then blended in a weight ratio of 30:70 and then fed into the twin-screw extruder for forming sheet.

<Property Evaluations>

Heat-shrinkable polyester films of EX1 to EX6 and CE1 to CE5 were evaluated using the following tests. The results are presented in Tables 1 to 4.

Figure 2:
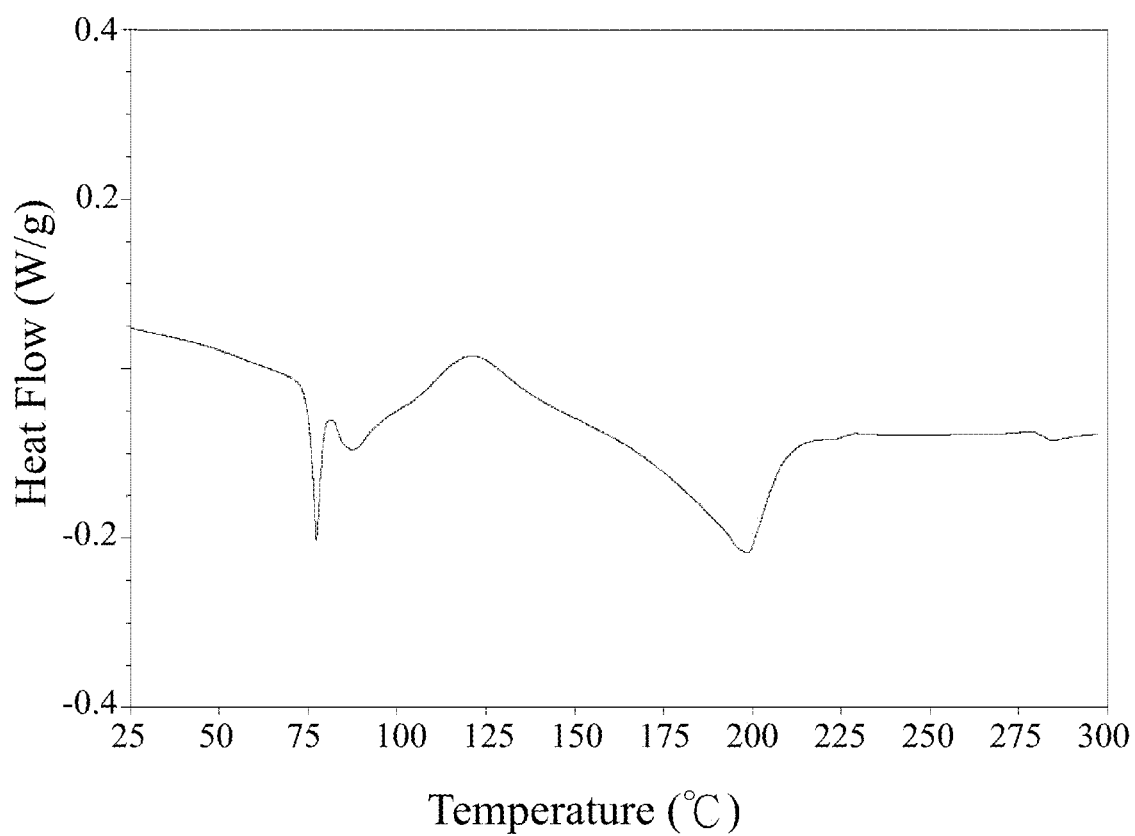
FIG. 2 depicts a DSC curve of a heat-shrinkable polyester film in Example 2.
Figure 3:
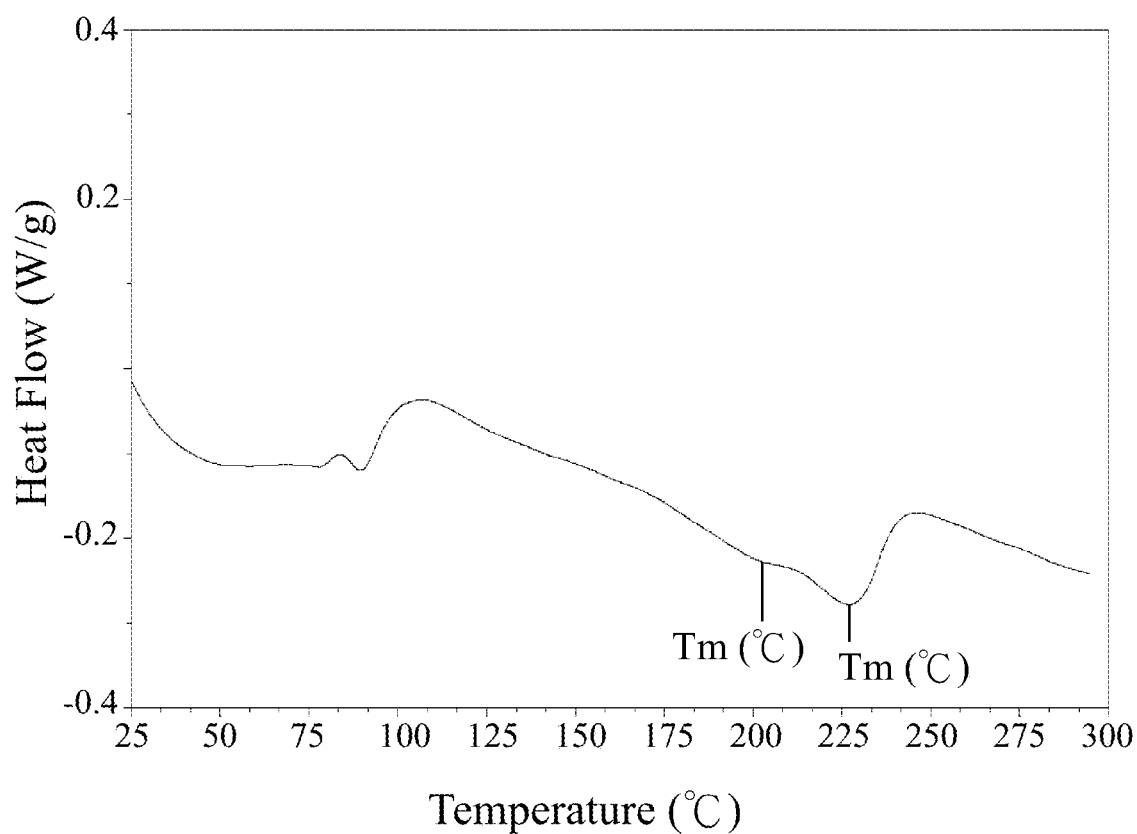
FIG. 3 depicts a DSC curve of a heat-shrinkable polyester film in Comparative Example 2.

1. Differential Scanning Calorimetry:

Each of the heat-shrinkable polyester films was analyzed by a differential scanning calorimeter (DSC) (Manufacturer: TA Instruments, USA; Model: 2910 Modulated DSC). A test temperature was raised from −50° C. to 300° C. at a heating rate of 10° C./minute. The T1(° C.), T2(° C.), T3(° C.), Tch(° C.), and Tm(° C.) were obtained from the DSC curve. The crystallization enthalpy (Hch) was determined by an area obtained by integrating the heat flow of the exothermic crystallization peak with time using the DSC. The melting enthalpy (Hm) was determined by an area obtained by integrating the heat flow of the endothermic melting peak with time using the DSC. A value of |Hm−Hch| was calculated. The results are presented in Table 1, and the DSC curves of EX2 and CE2 are as shown in FIGS. 2 and 3, respectively. It should be noted that, each of the heat-shrinkable polyester films of CE2 and CE5 exhibits two endothermic melting peaks, and therefore has two maximum points (Tm) of the endothermic melting peaks as shown in Table 1.

2. Birefringence (Δn):

Each of the heat-shrinkable polyester films was analyzed by a polarized optical microscope (Manufacturer: Leica Microsystems; Model: DM2700P) to obtain an in-plane retardation thereof, and then Δn was calculated by dividing the in-plane retardation over a thickness of the heat-shrinkable polyester film. The results are presented in Table 2.

3. Heat-Shrinkability (T° C. TD %, T° C. MD %):

A heat-shrinkability for each of the heat-shrinkable polyester films was measured according to JIS Z1709. To be specific, each of the heat-shrinkable polyester films was cut into a test sample having a dimension of 100 mm (in the machine direction)×100 mm (in the transverse direction) (i.e., the test sample having an original length ($L_0$) of 100 mm in both the machine and transverse directions). Subsequently, the test sample was subjected to heat treatment by immersing in hot water at a temperature (T° C.) for 10 seconds, and then cooling the sample in cold water at 30° C. for 30 seconds. A first length $L_1$ (mm) of the test sample in the transverse direction and a second length $L_2$ (mm) of the test sample in the machine direction were recorded. Finally, the heat shrinkability of the test sample in the transverse direction (T° C. TD %), and that in the machine direction (T° C. MD %) after heat treatment at T° C. were calculated based on the following formulas:

$$T° C.TD\% = [(L_0-L_1)/L_0] \times 100\%, \text{ and} \quad (1)$$

$$T° C.MD\% = [(L_0-L_2)/L_0] \times 100\%, \quad (2)$$

wherein T° C. is 99° C., 90° C., 80° C., 70° C. or 60° C.

4. Δ(70−60) TD % and Δ(90−80) TD % (unit: %/° C.):

The Δ(70−60) TD % and Δ(90−80) TD % of each of the heat-shrinkable polyester films were calculated based on the following formula using the heat-shrinkabilities obtained above:

$$\Delta(70-60)TD\% = (70° C.TD\% - 60° C.TD\%)/(70° C.-60° C.), \text{ and}$$

$$\Delta(90-80)TD\% = (90° C.TD\% - 80° C.TD\%)/(90° C.-80° C.)$$

The results are presented in Table 3.

5. TDMax % and $\Delta n_c$:

The TDMax % and $\Delta n_c$ of each of the heat-shrinkable polyester films were calculated based on the following formula:

$$TD \text{ Max} \% = [(TDX-1)/TDX] \times 100\%, \text{ and}$$

$$\Delta n_c = \Delta n \times [1-(99° C.TD\%/TD \text{ Max } \%)],$$

wherein TDX is the stretch ratio of the sheet in the transverse direction (e.g., the TDX of the heat-shrinkable polyester films are 4.8, and therefore the TDMax % are 79.16%), and Δn is the birefringence of the heat-shrinkable polyester film obtained above.

6. Intrinsic Viscosity (dL/g):

The intrinsic viscosity of each of the heat-shrinkable polyester films was measured according to ASTM D4603 as mentioned above, except that the heat-shrinkable polyester films were subjected to the measurement instead of the polyester chips.

7. MD tear strength per unit thickness (N/mm):

A MD tear strength per unit thickness for each of the heat-shrinkable polyester films was measured according to JIS K7128 (published in 1998). To be specific, each of the heat-shrinkable polyester films was cut into a test sample having a dimension of 63 mm (in the machine direction)×75 mm (in the transverse direction). The test sample was tested using an Elmendorf tear tester (Manufacturer: Daiei Kagaku Seiki; Model: DAU-250, which includes a sector-shaped pendulum).

In the test, two opposite ends of the test sample in the transverse direction were fixed by two clamps, and the middle portion of the test sample was cut in the machine direction (i.e., the test direction) to obtain an incision of 20 mm. Next, the sector-shaped pendulum was kept at a starting position with a maximum potential energy, and the test sample was placed in the Elmendorf tear tester with the incision arranged on a releasing path of the pendulum. After the pendulum was released from the starting position, an energy required for the pendulum to tear the test sample along the incision was measured, and then converted into the tear strength by the tear tester. The results concerning the tear strength and the tear strength per unit thickness for each of the heat-shrinkable polyester films are presented in Table 4.

8. MD Elongation at Break after Accelerated Aging:

A MD elongation at break after accelerated aging of each of the heat-shrinkable polyester films was measured according to ASTM D882 (published in 2002). To be specific, each of the heat-shrinkable polyester films was cut into a test sample having a dimension of 150 mm (in the machine direction)×15 mm (in the transverse direction). The test sample was then baked in an oven at 60° C. for an hour, and then subjected to a test using a material testing machine (Manufacturer: Cometech Testing Machines Co.; Model No.: QC-508B1). In the test, two ends of the test sample in the machine direction were fixed by two clamps which were initially spaced apart by 100 mm, and then the test sample was stretched at 100 mm/min by the clamps until break. A distance ($L_3$) between the two clamps in the machine direction (mm) at break of the test sample was recorded, and the elongation in the machine direction at break was calculated based on the formula:

$$MD \text{ elongation at break after accelerated aging} = [(L_3-L_0)/L_0] \times 100\%,$$

wherein $L_0$ is an initial distance (100 mm) between the two clamps that clamp therebetween the test sample in the machine direction, and $L_3$ is a distance between the two clamps in the machine direction at break of the test sample. The test was repeated for 5 times, and an average was calculated and presented in Table 4.

The elongation at break in the machine direction of the heat-shrinkable polyester films is required to be greater than 400%, as determined by downstream manufacturers.

TABLE 1

| | Amount of recycled material (wt %) | T2 − T1 (° C.) | T3 − T2 (° C.) | Tch (° C.) | Tm (° C.) | \| Hm − Hch \| (J/g) |
|---|---|---|---|---|---|---|
| EX1 | 15 | 60.1 | 65.0 | 120.5 | 198.3 | 5.5 |
| EX2 | 30 | 63.7 | 73.0 | 121.2 | 198.5 | 5.9 |
| EX3 | 50 | 52.9 | 60.8 | 124.3 | 193.4 | 7.0 |
| EX4 | 70 | 57.2 | 53.1 | 125.2 | 188.5 | 2.8 |
| EX5 | 82.6 | 58.5 | 61.2 | 123.3 | 197.5 | 4.8 |
| EX6 | 86.7 | 58.9 | 63.0 | 121.3 | 196.8 | 6.3 |
| CE1 | 0 | 55.8 | 60.3 | 120.4 | 197.5 | 7.7 |
| CE2 | 30 | 71.1 | 83.2 | 107.7 | 201.1 / 226.3 | 10.4 |
| CE3 | 50 | 77.6 | 107.0 | 98.6 | 246.2 | 40.8 |
| CE4 | 70 | 82.7 | 106.3 | 97.6 | 249.0 | 44.5 |
| CE5 | 30 | 78.1 | 94.2 | 99.0 | 208.1 / 235.3 | 15.1 |

TABLE 2

| | Amount of recycled material (wt %) | $\Delta n$ | 99° C. TD % (%) | TDX | TDMax % (%) | $\Delta n_c$ |
|---|---|---|---|---|---|---|
| EX1 | 15 | 0.1054 | 76.4 | 4.8 | 79.16 | $3.675 \times 10^{-3}$ |
| EX2 | 30 | 0.0962 | 76.3 | 4.8 | 79.16 | $3.476 \times 10^{-3}$ |
| EX3 | 50 | 0.0870 | 75.6 | 4.8 | 79.16 | $3.913 \times 10^{-3}$ |
| EX4 | 70 | 0.0953 | 76.2 | 4.8 | 79.16 | $3.564 \times 10^{-3}$ |
| EX5 | 82.6 | 0.0987 | 76.8 | 4.8 | 79.16 | $2.943 \times 10^{-3}$ |
| EX6 | 86.7 | 0.0973 | 76.3 | 4.8 | 79.16 | $3.515 \times 10^{-3}$ |
| CE1 | 0 | 0.1094 | 75.9 | 4.8 | 79.16 | $4.505 \times 10^{-3}$ |
| CE2 | 30 | 0.1153 | 70.9 | 4.8 | 79.16 | $12.031 \times 10^{-3}$ |
| CE3 | 50 | 0.1215 | 54.6 | 4.8 | 79.16 | $37.696 \times 10^{-3}$ |
| CE4 | 70 | 0.0907 | 36.0 | 4.8 | 79.16 | $49.451 \times 10^{-3}$ |
| CE5 | 30 | 0.1174 | 69.0 | 4.8 | 79.16 | $15.068 \times 10^{-3}$ |

TABLE 3

| | Amount of recycled material (wt %) | 99° C. TD % (%) | 99° C. MD % (%) | 80° C. TD % (%) | 70° C. TD % (%) | $\Delta$ (70-60) TD % (%/° C.) | $\Delta$ (90-80) TD % (%/° C.) |
|---|---|---|---|---|---|---|---|
| EX1 | 15 | 76.4 | 0.1 | 67.0 | 28.9 | 2.89 | 0.80 |
| EX2 | 30 | 76.3 | -1.5 | 69.6 | 31.8 | 3.13 | 0.54 |
| EX3 | 50 | 75.6 | -1.0 | 68.3 | 26.8 | 2.58 | 0.66 |
| EX4 | 70 | 76.2 | -2.8 | 69.3 | 29.0 | 2.83 | 0.63 |
| EX5 | 82.6 | 76.8 | 0.3 | 66.5 | 28.0 | 2.80 | 0.24 |
| EX6 | 86.7 | 76.3 | 0.4 | 66.7 | 29.3 | 2.91 | 0.21 |
| CE1 | 0 | 75.9 | 0.0 | 67.5 | 27.0 | 2.70 | 0.67 |
| CE2 | 30 | 70.9 | 5.2 | 51.6 | 11.4 | 1.09 | 1.12 |
| CE3 | 50 | 54.6 | 7.7 | 31.5 | 4.6 | 0.40 | 0.94 |
| CE4 | 70 | 36.0 | 11.1 | 18.6 | 2.4 | 0.18 | 0.95 |
| CE5 | 30 | 69.0 | 4.5 | 50.0 | 12.1 | 1.16 | 1.10 |

TABLE 4

| | Amount of recycled material (wt %) | IV (dL/g) | MD tear strength (mN) | Thickness (μm) | MD tear strength per unit thickness (N/mm) | MD elongation at break after accelerated aging |
|---|---|---|---|---|---|---|
| EX1 | 15 | 0.625 | 978 | 40.5 | 24.1 | 464% |
| EX2 | 30 | 0.628 | 1080 | 41.7 | 25.9 | 489% |
| EX3 | 50 | 0.623 | 1055 | 40.5 | 26.0 | 450% |
| EX4 | 70 | 0.637 | 999 | 41.6 | 24.0 | 425% |
| EX5 | 82.6 | 0.624 | 950 | 40.5 | 23.5 | 445% |
| EX6 | 86.7 | 0.625 | 989 | 40.8 | 24.2 | 453% |
| CE1 | 0 | 0.620 | 941 | 40.1 | 23.5 | 506% |
| CE2 | 30 | 0.601 | 1236 | 39.4 | 31.4 | 380% |
| CE3 | 50 | 0.588 | 3344 | 40.3 | 83.0 | 310% |
| CE4 | 70 | 0.579 | 4354 | 41.2 | 105.7 | 250% |
| CE5 | 30 | 0.680 | 1655 | 41.9 | 39.5 | 475% |

<Discussion and Results>

1. The heat-shrinkable polyester films of CE1 was provided for determining the characteristics of a conventional heat-shrinkable polyester film, which has a low degree of crystallinity and which does not include the recycled material.

2. Based on the results in Tables 1, 3, and 4, the heat-shrinkable polyester films of EX1 to EX6 (which include the recycled material in amounts ranging from 15 wt % to 86.7 wt %) have exothermic crystallization peaks and endothermic melting peaks that satisfy relationships of T2−T1≤68° C. and T3−T2≤78° C., and have satisfactory characteristics (e.g., heat-shrinkability, MD tear strength per unit thickness, and MD elongation at break after accelerated aging) for packaging of containers having high curvatures. In comparison, the heat-shrinkable polyester films of CE2 to CE5, which do not satisfy the above relationships, exhibit relatively poor characteristics.

3. Based on the results in Tables 2, 3, and 4, the heat-shrinkable polyester films of EX1 to EX6, each having the recycled material (in amounts ranging from 15 wt % to 86.7 wt %) and having $\Delta n_c$ not greater than $10 \times 10^{-3}$, have satisfactory characteristics (e.g., heat-shrinkability, MD tear strength per unit thickness, and MD elongation at break after accelerated aging), and thus meet the requirement for packaging containers having high curvatures.

4. A comparison between the heat-shrinkable polyester films of EX2 and CE2 was made below based on FIGS. 2 and 3 and the results shown in Table 1.

(1) While both of the heat-shrinkable polyester films of EX2 and CE2 include 30 wt % of the recycled material, EX2 has a lower difference value between T2 and T1, a lower difference value between T3 and T2, and a higher value of Tch as compared to CE2. In other words, the heat-shrinkable polyester film of EX2 has a slower rate of thermal crystallization, a smaller width of the exothermic crystallization peak, and a smaller width of the endothermic melting peak.

(2) While EX2 exhibits only one endothermic melting peak at 198.5° C. (see FIG. 2), CE2 exhibits two endothermic melting peaks at 201° C. and 226.3° C. (see FIG. 3). In addition, while EX2 has a relatively low |Hm−Hch| value of 5.9 J/g, CE2 has a higher |Hm−Hch| value of 10.4 J/g. These results indicate that the heat-shrinkable polyester film of CE2 includes not only crystals (Tm≤220° C.) formed during the film formation process, but also includes crystals (Tm≥220° C.) of unreacted polyester segments of the recycled material formed in an incomplete esterification reaction. Therefore, the heat-shrinkable polyester film of CE2 may have a higher rate of thermal crystallization and a higher degree of crystallinity, which adversely affect the characteristics thereof.

Further, although the heat-shrinkable polyester films of CE3 and CE4 do not exhibit two endothermic melting peaks similar to that of CE2, they also have unsatisfactory characteristics due to a higher difference value between T2 and T1 and a higher value between T3 and T2.

5. The birefringence (Δn) in Table 2 represents an overall degree of orientation in a heat-shrinkable polyester film, which is a sum of degrees of orientation of crystalline phase and amorphous phase in the heat-shrinkable polyester film. $\Delta n_c$ represents a degree of crystallinity (i.e., a degree of crystal arrangement) in a heat-shrinkable polyester film, and is calculated using the equation of $\Delta n_c = \Delta n \times [1-(99° C. TD \%/TDMax \%)]$. The lower the $\Delta n_c$, the less the crystallinity of the heat-shrinkable polyester film (i.e., the heat-shrinkable polyester film is less likely to be adversely affected). According to the results in Table 2, the heat-shrinkable polyester films of EX1 to EX6 have relatively low $\Delta n_c$ and low degrees of crystallinity. In comparison, the heat-shrinkable polyester films of CE2 to CE4 exhibit relatively high $\Delta n_c$ and relatively high degrees of crystallinity, and may thus have relatively poor characteristics shown in Tables 3 and 4. It should be noted that the heat-shrinkable polyester film of CE1 also exhibits a relatively low $\Delta n_c$ because such heat-shrinkable polyester film was made without using the recycled material.

6. Based on the results in Table 3, the heat-shrinkable polyester film of CE2 exhibits a 99° C. TD % of 70.9%, which is lower than the 73% required for packaging of containers having high curvatures. In addition, the heat-shrinkable polyester film of CE2 exhibits a relatively high 99° C. MD % of 5.2%, which might result in a label made from the heat-shrinkable film being unable to shrink tightly over a curved edge at a top of a container. Further, the heat-shrinkable polyester film of CE2 exhibits a relatively low value of 70° C. TD % and a relatively small value of Δ(70–60)TD %, which might cause the heat-shrinkable polyester film to start shrinking only after a long period of time. Moreover, the heat-shrinkable polyester film of CE2 exhibits a relatively low value of 80° C. TD % and a relatively large value of Δ(90–80) TD %, which indicates that a higher temperature or a longer time period is required for complete shrinkage thereof. When the heat-shrinkable polyester film is insufficiently heated, defects in appearances, such as creases, wrinkling and poor distribution of colors thereof might occur. In comparison, the heat-shrinkable polyester films of EX1 to EX6 exhibit none of the abovementioned problems despite including high amounts of the recycled material, and are thus suitable for use as shrink sleeve labels for packaging of containers having high curvatures.

7. The MD tear strength per unit thickness should have a sufficiently low value to facilitate removal of the heat-shrinkable polyester films from containers during a recycling process. Based on the results in Table 4, the heat-shrinkable polyester films of EX1 to EX6 exhibit relatively low MD tear strengths per unit thickness, which ranges from 5 N/mm to 28 N/mm, and adequate viscosities, so that removal of the heat-shrinkable polyester films of EX1 to EX6 from the containers may be as easy as that for the heat-shrinkable polyester film of CE1 (which does not include the recycled material). In comparison, the heat-shrinkable polyester films of CE2 to CE4 exhibit relatively high MD tear strengths per unit thickness due to high degrees of crystallinity (i.e., high $\Delta n_c$) thereof, which might increase difficulty in removing the heat-shrinkable polyester films from the containers, and might result in insufficient MD elongation at break after accelerated aging. Therefore, labels made from the heat-shrinkable polyester films of CE2 to CE4 might suffer from a higher rate of damage after storage for a long period of time, causing reduction in processing stability for subsequent applications of the labels. In addition, the heat-shrinkable polyester film of CE5 is made of a bottle-recycled material having a relatively high viscosity, and therefore has relatively high MD tear strength per unit thickness (which may adversely affect the recycling process for the film of CE5), while having relatively high MD elongation at break after accelerated aging (the labels made from the film of CE5 may be less likely to be damaged).

8. By comparing methods for manufacturing the heat-shrinkable polyester films of EX 1 to EX6 with those of CE2 to CE4, it can be noted that when the polyester chips are blended with the recycled materials before extrusion (i.e., CE2 to CE4), the viscosities of the thus obtained heat-shrinkable polyester films will be affected by the viscosities of the recycled materials. When the viscosity of the heat-shrinkable polyester film is lower than 0.60 dL/g, the MD elongations at break after accelerated aging might be inappropriately low, and when the viscosity of the heat-shrinkable polyester film is higher than 0.74 dL/g, the MD tear strengths per unit thickness might be inappropriately high for subsequent applications. In comparison, in the methods for manufacturing the heat-shrinkable polyester films of EX1 to EX6, the recycled materials were added and blended with components for forming polyester in a process for forming the polyester chips, rather than being blended with the polyester chips in a process for extruding a sheet for forming the heat-shrinkable polyester film. As such, the viscosities of the heat-shrinkable polyester films of EX1 to EX6 may be controlled to be within a range of 0.60 dL/g to 0.74 dL/g (or even within a range of 0.61 dL/g to 0.67 dL/g). The thus obtained heat-shrinkable polyester films of this disclosure successfully exhibit MD tear strengths per unit thickness which range from 5 N/mm to 28 N/mm, and MD elongations at break after accelerated aging of over 400%.

In sum, the heat-shrinkable polyester film of the disclosure satisfy relationships of T2−T1≤68° C. and T3−T2≤78° C. or has a relatively low $\Delta n_c$, and thus may exhibit satisfactory characteristics such as a high heat-shrinkability in the transverse direction and a low heat-shrinkability in the machine direction at various temperatures, a relatively low tear strength per unit thickness in the machine direction, and a relatively high elongation at break in the machine direction after accelerated aging, etc. With the abovementioned characteristics, the heat-shrinkable polyester film of this disclosure may satisfy the requirements for packaging of containers having high curvatures (e.g., complete shrinkage, a good appearance without creases, and easy removal from containers during a recycling process).

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A heat-shrinkable polyester film made of a polyester-forming resin composition which includes a recycled material, terephthalic acid, ethylene glycol, and an alcohol modifier, and based on a total molar amount of said ethylene glycol and said alcohol modifier, said ethylene glycol is present in an amount ranging from 70 mol % to 85 mol %, and said alcohol modifier is present in an amount ranging from 15 mol % to 30 mol %, said heat-shrinkable polyester film having an exothermic crystallization peak and an endothermic melting peak, which are determined via differential scanning calorimetry and which satisfy relationships of 30° C.≤$T2-T1$≤68° C. and

30° C.≤$T3-T2$≤78° C., where
   T1 represents an onset point of said exothermic crystallization peak, T2 represents an end point of said exothermic crystallization peak and an onset point of said endothermic melting peak, and T3 represents an end point of said endothermic melting peak, wherein said recycled material includes a polyethylene terephthalate bottle-recycled material, and has an intrinsic viscosity, which is determined according to ASTM D4603, ranging from 0.50 dL/g to 1.00 dL/g, and wherein said alcohol modifier is neopentyl glycol.

2. The heat-shrinkable polyester film according to claim 1, wherein said exothermic crystallization peak and said endothermic melting peak further satisfy relationships of $$160° C. \leq Tm \leq 220° C.,$$

$$130° C. \geq Tch \geq 110° C., \text{ and}$$

$$|Hm-Hch| \leq 9.0 \text{ J/g,}$$

where
Tm represents a maximum point of said endothermic melting peak;
Tch represents a maximum point of said exothermic crystallization peak;
Hm represents a melting enthalpy calculated from said endothermic melting peak; and
Hch represents a crystallization enthalpy calculated from said exothermic crystallization peak.

3. The heat-shrinkable polyester film according to claim 1, wherein said recycled material is present in an amount ranging from 10 wt % to 96 wt %, based on a total weight of said polyester-forming resin composition.

4. The heat-shrinkable polyester film according to claim 1, which satisfies relationships of $$\Delta n_c \geq 10 \times 10^{-3}, \text{ and}$$

$$\Delta n_c = \Delta n \times [1-(99° C. \text{ } TD\%/TDMax \%)],$$

where
$\Delta n$ represents a birefringence of said heat-shrinkable polyester film;
99° C. TD % represents a heat-shrinkability of said heat-shrinkable polyester film in a transverse direction, which is measured according to JIS Z1709 after immersing said heat-shrinkable polyester film in hot water at 99° C. for 10 seconds and then removing from the hot water; and
TDMax %=[(TDX−1)/TDX]×100%, in which TDX represents a stretch ratio of a sheet in the transverse direction in a process for forming said heat-shrinkable polyester film, said sheet being made of said polyester-forming resin composition.

5. The heat-shrinkable polyester film according to claim 1, wherein said polyester-forming resin composition further a second modifier being selected from the group consisting of an acid, an alcohol, and a combination thereof.

6. The heat-shrinkable polyester film according to claim 5, wherein said second modifier is an acid, and based on a total molar amount of said terephthalic acid and said second modifier, said terephthalic acid is present in an amount greater than 85 mol % and less than 100 mol %, and said second modifier is present in an amount greater than 0 mol % and not greater than 15 mol %.

7. The heat-shrinkable polyester film according to claim 5, wherein said second modifier is selected from the group consisting of isophthalic acid, succinic acid, adipic acid, 1,3-propanediol, 2,2-diethyl-1,3-propanediol, 2-butyl-2-ethyl-1,3-propanediol, 1,6-hexanediol, 2,3-dimethyl-2,3-butanediol, 2-methyl-1,3-propanediol, 1,4-cyclohexanedimethanol, butanediol, diethylene glycol, triethylene glycol, polyethylene glycol, poly(tetramethylene ether) glycol, and combinations thereof.

8. The heat-shrinkable polyester film according to claim 1, having a heat-shrinkability which is measured according to JIS Z1709 after immersing said heat-shrinkable polyester film in hot water for 10 seconds and then removing from the hot water, wherein
the heat-shrinkability in a transverse direction is at least 73.0% when the hot water is 99° C.,
the heat-shrinkability in a machine direction ranges from −3.0% to 3.0% when the hot water is 99° C.,
the heat-shrinkability in the transverse direction is at least 60.0% when the hot water is 80° C., and
the heat-shrinkability in the transverse direction is at least 15.0% when the hot water is 70° C.

9. The heat-shrinkable polyester film according to claim 1, having a heat-shrinkability which is measured according to JIS Z1709 after immersing said heat-shrinkable polyester film in hot water for 10 seconds and then removing from the hot water, said heat-shrinkable polyester film satisfying relationships of $$\Delta(70-60)TD\%=(70° C.TD\%-60° C.TD\%)/(70° C.-60° C.) \geq 1.5\%/° C., \text{ and}$$

$$\Delta(90-80)TD\%=(90° C.TD\%-80° C.TD\%)/(90° C.-80° C.)1\%/° C.,$$

where
60° C. TD %, 70° C. TD %, 80° C. TD %, and 90° C. TD % represent the values of the heat-shrinkability in a transverse direction when the hot water is 60° C., 70° C., 80° C., and 90° C., respectively.

10. The heat-shrinkable polyester film according to claim 1, having:
an intrinsic viscosity ranging from 0.600 dL/g to 0.740 dL/g;
a tear strength per unit thickness in a machine direction which ranges from 5 N/mm to 28 N/mm, and which is determined according to JIS K7128; and
an elongation at break in the machine direction, which is greater than 400%, and which is determined according to ASTM D882 after accelerated aging at 60° C. for an hour.

11. A method for manufacturing the heat-shrinkable polyester film according to claim 1, comprising the steps of:
a) providing the polyester-forming resin composition including the recycled material;
b) heating the polyester-forming resin composition in nitrogen atmosphere to permit the polyester-forming resin composition to undergo esterification reaction so as to obtain an esterified product;
c) subjecting the esterified product to heating and polymerization reaction in vacuum and in the presence of a catalyst and a heat stabilizer until the esterified product reaches an intrinsic viscosity ranging from 0.5 dL/g to 0.8 dL/g so as to obtain a polyester product;
d) subjecting the polyester product to granulation so as to obtain a plurality of polyester chips;
e) subjecting the polyester chips to heating and extruding so as to obtain a sheet; and
f) subjecting the sheet to a film formation process so as to obtain the heat-shrinkable polyester film.

12. The method according to claim 11, wherein the polyester-forming resin composition provided in step a) further includes a second modifier which is selected from the group consisting of isophthalic acid, succinic acid, adipic acid, 1,3-propanediol, 2,2-diethyl-1,3-propanediol, 2-butyl-2-ethyl-1,3-propanediol, 1,6-hexanediol, 2,3-dimethyl-2,3-butanediol, 2-methyl-1,3-propanediol, 1,4-cyclohexanedimethanol, butanediol, diethylene glycol, triethylene glycol, polyethylene glycol, poly(tetramethylene ether) glycol, and combinations thereof.

13. The method according to claim 11, wherein the recycled material is present in an amount greater than 10 wt % based on a total weight of the polyester-forming resin composition.

14. The method according to claim 11, wherein in step b), the polyester-forming resin composition is heated at a temperature ranging from 225° C. to 275° C.

15. The method according to claim 11, wherein in step c), the esterified product is heated at a temperature ranging from 250° C. to 300° C.

16. The method according to claim 11, wherein in step e), the polyester chips are heated in multiple stages at temperatures ranging from 200° C. to 260° C.

17. The method according to claim 11, wherein in step f), the sheet in the film formation process is heated and softened at a temperature ranging from 80° C. to 110° C., and then stretched in a transverse direction at a stretch ratio ranging from 3 to 5.5 at a temperature ranging from 70° C. to 100° C.

18. The heat-shrinkable polyester film according to claim 1, wherein the recycled material, ethylene glycol, terephthalic acid, and alcohol modifier are mixed prior to undergoing an esterification reaction to form an esterified product.

19. The heat-shrinkable polyester film according to claim 1, wherein said polyester-forming resin composition further includes at least one additive selected from catalysts, heat-stabilizers, stabilizers, antioxidants, antistatic agents, antifoam agents, dyeing assistants, dyes, colorants, delusterants, fluorescent brighteners, and reaction promoters.

20. A heat-shrinkable polyester film made of a polyester-forming resin composition comprising terephthalic acid, ethylene glycol, neopentyl glycol, and a polyethylene terephthalate bottle-recycled material in an amount ranging from 15 wt % to 86.7 wt % based on the total mass of the polyester-forming resin composition, and based on a total molar amount of said ethylene glycol and said neopentyl glycol, said ethylene glycol is present in an amount ranging from 70 mol % to 85 mol %, and said neopentyl glycol is present in an amount ranging from 15 mol % to 30 mol %, said heat-shrinkable polyester film having an exothermic crystallization peak and an endothermic melting peak, which are determined via differential scanning calorimetry and which satisfy relationships of $52.9° C. \le T2-T1 \le 63.7° C.$ and $53.1° C. \le T3-T2 \le 73.0° C.$, where
T1 represents an onset point of said exothermic crystallization peak,
T2 represents an end point of said exothermic crystallization peak and an onset point of said endothermic melting peak, and
T3 represents an end point of said endothermic melting peak.

21. The heat-shrinkable polyester film according to claim 1, wherein said recycled material further includes a recycled terephthalic acid.

22. The method according to claim 11, wherein said recycled material further includes a recycled terephthalic acid.

* * * * *